US012567004B2

(12) United States Patent
Wang et al.

(10) Patent No.: US 12,567,004 B2
(45) Date of Patent: Mar. 3, 2026

(54) METHOD OF MACHINE LEARNING TRAINING FOR DATA AUGMENTATION

(71) Applicant: Intuit Inc., Mountain View, CA (US)

(72) Inventors: Wei Wang, Fremont, CA (US);
Jingxian Liao, San Jose, CA (US);
Zhicheng Xue, Union City, CA (US);
Anthony Hiotong Wong Lei, San Mateo, CA (US)

(73) Assignee: Intuit Inc., Mountain View, CA (US)

( * ) Notice: Subject to any disclaimer, the term of this patent is extended or adjusted under 35 U.S.C. 154(b) by 1125 days.

(21) Appl. No.: 17/161,575

(22) Filed: Jan. 28, 2021

(65) Prior Publication Data

US 2022/0237520 A1 Jul. 28, 2022

(51) Int. Cl.
| | |
|---|---|
| *G06N 20/20* | (2019.01) |
| *G06F 16/22* | (2019.01) |
| *G06F 16/25* | (2019.01) |
| *G06N 5/04* | (2023.01) |
| *G06Q 40/03* | (2023.01) |
| G06Q 30/018 | (2023.01) |
| H04L 9/40 | (2022.01) |

(52) U.S. Cl.
CPC ......... *G06N 20/20* (2019.01); *G06F 16/2246* (2019.01); *G06F 16/25* (2019.01); *G06N 5/04* (2013.01); *G06Q 40/03* (2023.01); *G06Q 30/0185* (2013.01); *H04L 63/08* (2013.01)

(58) Field of Classification Search
CPC ........... G06N 20/20; G06N 5/04; G06Q 40/03
See application file for complete search history.

(56) References Cited

U.S. PATENT DOCUMENTS

| | | | |
|---|---|---|---|
| 2017/0061330 A1* | 3/2017 | Kurata ................... | G06N 20/00 |
| 2020/0250527 A1* | 8/2020 | Zhao ....................... | G06N 3/047 |

OTHER PUBLICATIONS

Sohn, Kihyuk, et al. "Fixmatch: Simplifying semi-supervised learning with consistency and confidence." (Year: 2020).*
Han, Yaodong, et al. "Detection and analysis of credit card application fraud using machine learning algorithms." (Year: 2020).*
Chen, Mu-Chen, and Shih-Hsien Huang. "Credit scoring and rejected instances reassigning through evolutionary computation techniques." (Year: 2003).*
Kozodoi, Nikita, et al. "Shallow self-learning for reject inference in credit scoring." (Year: 2020).*

(Continued)

*Primary Examiner* — Michelle T Bechtold
*Assistant Examiner* — Matiyas T Maru
(74) *Attorney, Agent, or Firm* — Lathrop GPM LLP

(57) ABSTRACT

A method including training, using accepted data having known labels, an untrained prediction model to generate a trained prediction model. The method also includes generating, using the trained prediction model, predicted labels for unknown data. The method also includes generating, using a confidence model, confidence scores for the predicted labels. The method also includes selecting, using the confidence scores, a subset of the unknown data and confident labels. The confident labels include ones of the predicted labels for the subset of the unknown data. The method also includes training, using the subset of the unknown data and the confident labels, the trained prediction model to generate an updated prediction model.

10 Claims, 9 Drawing Sheets

(56) References Cited

OTHER PUBLICATIONS

Bao, Wang, Ning Lianju, and Kong Yue. "Integration of unsupervised and supervised machine learning algorithms for credit risk assessment." (Year: 2019).*

Wu, Di, et al. "A highly accurate framework for self-labeled semi-supervised classification in industrial applications." (Year: 2017).*

Ouali et al., "An overview of deep semi-supervised learning." (Year: 2020).*

Xie, et al., "Self-training with noisy student improves imagenet classification." (Year: 2020).*

Yalniz, I. Zeki, et al. "Billion-scale semi-supervised learning for image classification." (Year: 2019).*

Rosenberg, Chuck, Martial Hebert, and Henry Schneiderman. "Semi-supervised self-training of object detection models." (Year: 2005).*

Zhang, et al., "Class-incremental learning via deep model consolidation." (Year: 2020).*

Amazon SageMaker, "How Hyperparameter Tuning Works"; https://docs.aws.amazon.com/sagemaker/latest/dg/automatic-model-tuning-how-it-works.html; Jan. 2021 (2 pages).

Bradley, Andrew P., "The Use of the Area Under the ROC Curve in the Evaluation of Machine Learning Algorithms"; Pattern Recognition; vol. 30, Issue 7; pp. 1145-1159; Jul. 1997 (15 pages).

Dmlc / xgboost, "[New Feature] Monotonic Constraints in Tree Construction"; https://github.com/dmlc/xgboost/issues/1514; Issue #1514; Aug. 27, 2016 (21 pages).

Hand, D.J. et al., "Can reject inference ever work?"; IMA Journal of Management Mathematics; vol. 5, Issue 1; pp. 45-55; Jan. 1, 1993 (11 pages).

Jiang, Heinrich et al., "To Trust or Not to Trust a Classifier"; Proceedings of the 32nd International Conference on Neural Information Processing Systems (NIPS'18); pp. 5546-5557; Dec. 2018 (12 pages).

Shiryayev, A. N. (Ed.), "15. On the Empirical Determination of a Distribution Law"; Selected Works of A. N. Kolmogorov: vol. II Probability Theory and Mathematical Statistics; pp. 139-146; 1992 (8 pages).

Kozodoi, Nikita et al., "Shallow Self-Learning for Reject Inference in Credit Scoring"; Joint European Conference on Machine Machine Learning and Knowledge Discovery in Databases (ECML PKDD 2019); pp. 516-532; Sep. 16-20, 2019 (17 pages).

Li, Zhiyong et al., " Inferring the outcomes of rejected loans: an application of semisupervised clustering"; The Journal of the Royal Statistical Society, Series A (Statistics in Society); vol. 183, Issue 2; pp. 631-654; Feb. 2020 (24 pages).

Li, Zhiyong et al., "Reject inderence in credit scoring using Semi-supervised Support Vector Machines"; Expert Systems with Applications; vol. 74; pp. 105-114; May 15, 2017 (10 pages).

Lundberg, Scott M. et al., "A Unified Approach to Interpreting Model Predictions"; Proceeding of the 31st International Conference on Neural Information Processing Systems (NIPS'17); pp. 4765-4774; Dec. 2017 (10 pages).

Montrichard, Derek et al., "Reject Inference Methodologies in Credit Rish Modeling"; Proceedings of the 16th annual Southeast SAS Users Group Conference (SESUG 2008); Oct. 19-22, 2008 (10 pages).

Niculescu-Mizil, Alexandru et al., "Predicting good probabilities with supervised learning"; Proceedings of the 22nd International conference on Machine learning (ICML '05); pp. 625-632; Aug. 2005 (8 pages).

Ratner, Alexander et al., "Snorkel: Rapid Training Data Creation with Weak Supervision"; Proceedings of the VLDB Endowment; vol. 11, Issue 3; pp. 269-282; Nov. 2017 (14 pages).

Siddiqi, Naeem, "Credit Risk Scorecards: Developing and Implementing Intelligent Credit Scoring" John Wiley & Sons, Inc.; Chapter 6: Scorecard Development Process, Stage 4: Scorecard Development, Reject Inference; pp. 98-113; Oct. 24, 2005 (16 pages).

Smirnov, N., "Table for Estimating the Goodness of Fit of Empirical Distributions"; The Annals of Mathematical Statistics; vol. 19, Issue 2; pp. 279-281; Jun. 1948 (3 pages).

Snorkel, "Programmatically Build Training Data"; https://www.snorkel.org/; 2020 (6 pages).

Trihuero, Isaac et al., "Self-labeled techniques for semi-supervised learning: taxonomy, software and empirical study"; Knowledge and Information Systems; vol. 42, Issue 2; pp. 245-284; Feb. 2015 (40 pages).

Wang, Wei et al., "Using Small Business Banking Data for Explainable Credit Risk Scoring"; Proceedings of the Thirty-Second Conference on Innovatice Applications of Artificial Intelligence (IAAI-20); vol. 34, Issue 8; pp. 13396-13401; Feb. 7-12, 2020 (6 pages).

* cited by examiner

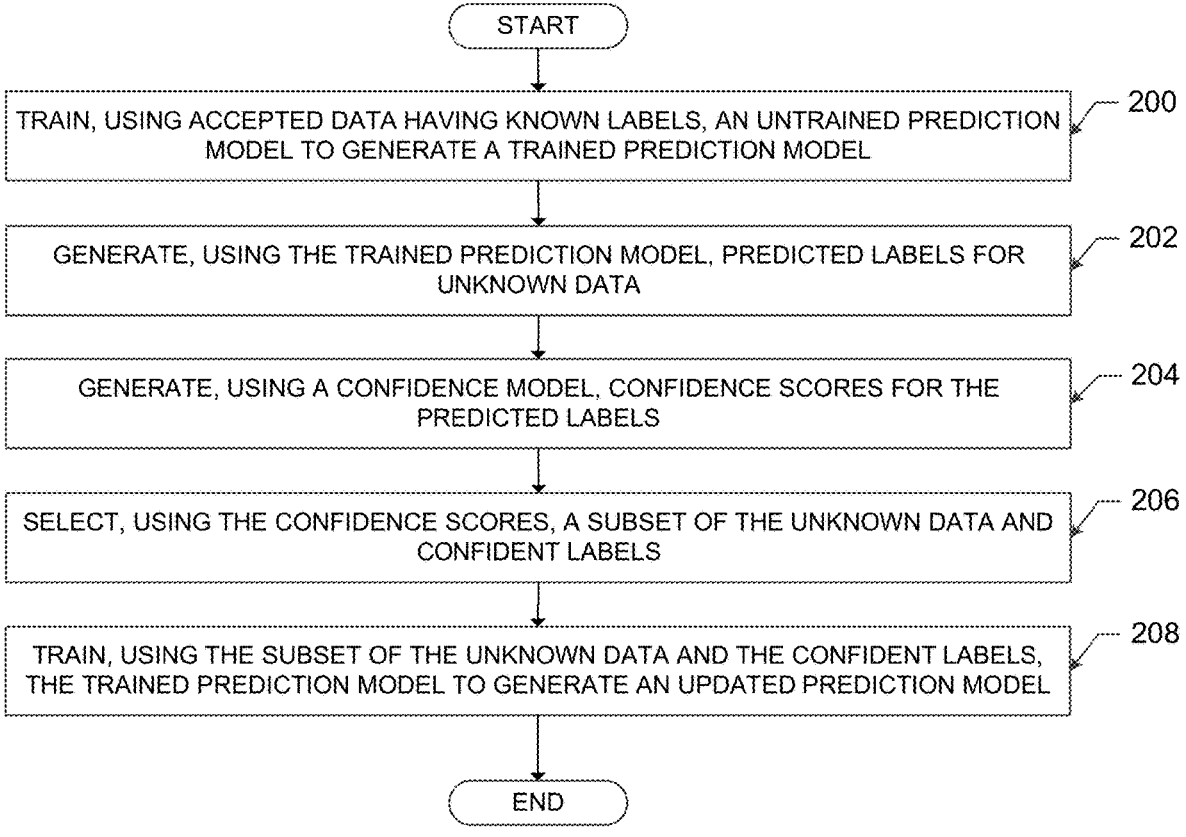

START

TRAIN, USING ACCEPTED DATA HAVING KNOWN LABELS, AN UNTRAINED PREDICTION MODEL TO GENERATE A TRAINED PREDICTION MODEL ⟍ 200

GENERATE, USING THE TRAINED PREDICTION MODEL, PREDICTED LABELS FOR UNKNOWN DATA ⟍ 202

GENERATE, USING A CONFIDENCE MODEL, CONFIDENCE SCORES FOR THE PREDICTED LABELS ⟍ 204

SELECT, USING THE CONFIDENCE SCORES, A SUBSET OF THE UNKNOWN DATA AND CONFIDENT LABELS ⟍ 206

TRAIN, USING THE SUBSET OF THE UNKNOWN DATA AND THE CONFIDENT LABELS, THE TRAINED PREDICTION MODEL TO GENERATE AN UPDATED PREDICTION MODEL ⟍ 208

END

*FIG. 2*

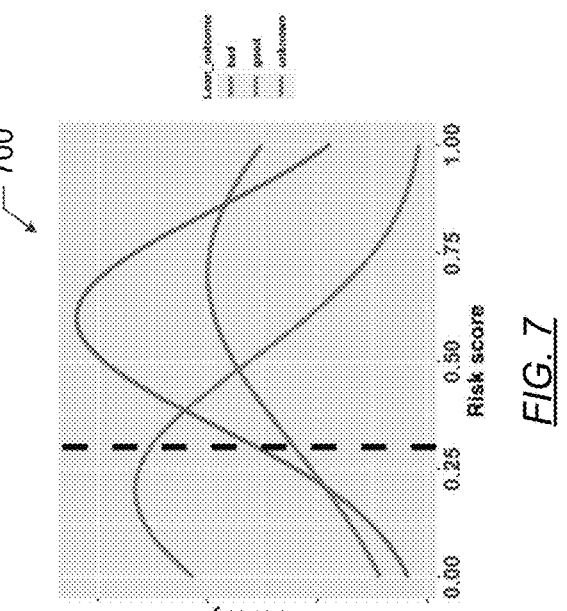

*FIG. 7*

Comparison of Performance of Reject Inference Methods and Benchmarks — 800

| Method* | Training size | AUC | K-S | Approval rate** @ 2.5% bad rate | Approval rate @ 3% bad rate | Approval rate @ 3.5% bad rate |
|---|---|---|---|---|---|---|
| KGB | 100% | 0.737 | 0.367 | 0.539 | 0.618 | 0.696 |
| FA | 238% | 0.738 | 0.365 | 0.510 | 0.603 | 0.684 |
| ST-TS | 126% | 0.732 | 0.356 | 0.514 | 0.617 | 0.704 |
| ST-CP | 115% | 0.740 | 0.381 | 0.543 | 0.602 | 0.706 |
| WS | 167% | 0.727 | 0.346 | 0.471 | 0.624 | 0.714 |

* KGB: Known Good/Bad model; FA: Fuzzy Augmentation; ST-TS: Self-training based on Trust Score; ST-CP: Self-training based on calibrated probability; and WS: Weak supervision.

** Approval rate: approval rate estimate based on labeled test dataset and unlabeled test set.

METHOD OF MACHINE LEARNING TRAINING FOR DATA AUGMENTATION

BACKGROUND

Machine learning models have a wide variety of applications. A machine learning model is a machine learning algorithm and one or more parameters that affect the output of the machine learning algorithm. The machine learning algorithm takes, as input, a data set and produces, as output, a prediction related to the data.

SUMMARY

The one or more embodiments provide for a method. The method includes training, using accepted data having known labels, an untrained prediction model to generate a trained prediction model. The method also includes generating, using the trained prediction model, predicted labels for unknown data. The method also includes generating, using a confidence model, confidence scores for the predicted labels. The method also includes selecting, using the confidence scores, a subset of the unknown data and confident labels. The confident labels include ones of the predicted labels for the subset of the unknown data. The method also includes training, using the subset of the unknown data and the confident labels, the trained prediction model to generate an updated prediction model.

The one or more embodiments also provide for a system. The system includes a processor and a data repository in communication with the processor. The system also includes a training application executable on the processor. The training application includes program code which, when executed, performs a computer-implemented method. The computer-implemented method includes training, using accepted data having known labels, an untrained prediction model to generate a trained prediction model. The computer-implemented method also includes generating, using the trained prediction model, predicted labels for unknown data. The computer-implemented method also includes generating, using a confidence model, confidence scores for the predicted labels. The computer-implemented method also includes selecting, using the confidence scores, a subset of the unknown data and confident labels, the confident labels including ones of the predicted labels for the subset of the unknown data. The computer-implemented method also includes training, using the subset of the unknown data and the confident labels, the trained prediction model to generate an updated prediction model.

The one or more embodiments also provide for another method. The method includes receiving live data including unknown labels. The method also includes generating, using an updated prediction model, predicted labels for the unknown data. Updating the prediction model includes training, using accepted data having known labels, an untrained prediction model to generate a trained prediction model. Updating the prediction model also includes generating, using the trained prediction model, predicted labels for unknown data. Updating the prediction model also includes generating, using a confidence model, confidence scores for the predicted labels. Updating the prediction model also includes selecting, using the confidence scores, a subset of the unknown data and confident labels, the confident labels including ones of the predicted labels for the subset of the unknown data. Updating the prediction model also includes training, using the subset of the unknown data and the confident labels, the trained prediction model to generate the updated prediction model. Updating the prediction model also includes presenting a result, to a user device, using the predicted labels.

Other aspects of the invention will be apparent from the following description and the appended claims.

BRIEF DESCRIPTION OF DRAWINGS

FIG. 2 is a flowchart of a method of improving the training of a machine learning model, in accordance with one or more embodiments of the invention.

FIG. 7 is a graph of density versus risk score, in accordance with one or more embodiments.

FIG. 8 is a table comparing performance of reject inference methods and benchmarks, in accordance with one or more embodiments.

DETAILED DESCRIPTION

Figure 1A:
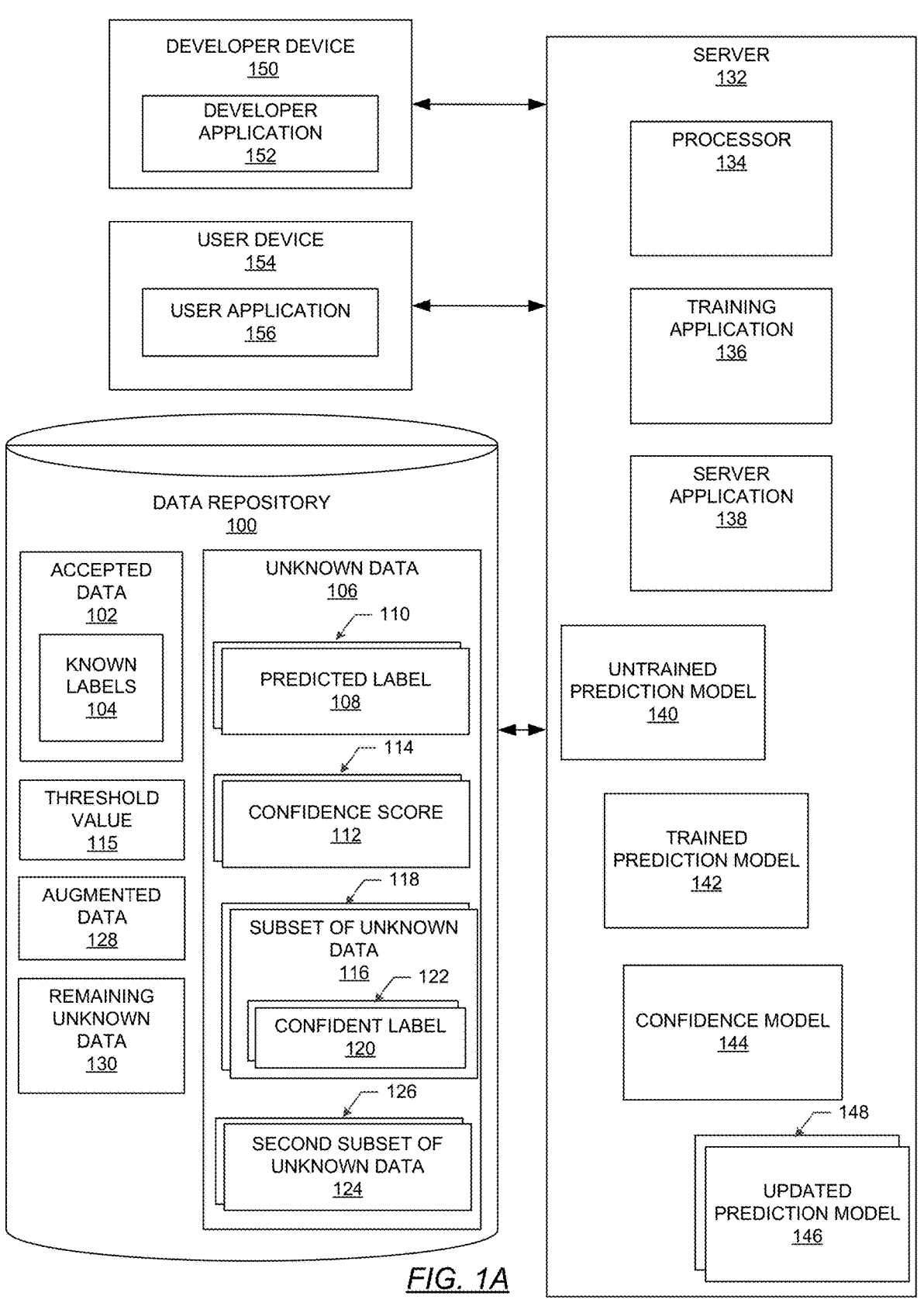
FIG. 1A and FIG. 1B show a computing system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, the one or more embodiments relate to self-training a prediction machine learning model. In an embodiment, the prediction machine learning algorithm is a supervised classifier that is iteratively trained on both known, labelled data and unknown data that has been pseudo-labelled in previous iterations of the training algorithm. Confidence machine learning models are introduced into the training algorithm in order to evaluate the confidence of predicted labels for unknown data to ensure the newly added training data is of desirable accuracy.

A more detailed summary of the one or more embodiments is now provided. As indicated above, the one or more embodiments relate to an improved method of training a machine learning model. Training begins with training data. Training data is data for which the predicted results are already known. Training a machine learning model takes the form of iteratively executing the machine learning algorithm on the training data to produce a prediction, comparing the prediction to the known result, and changing the parameters for the machine learning algorithm in a manner which is expected to bring a subsequent prediction closer to the known result.

For ease of notation, the following definitions are stated. A prediction model is a prediction machine learning model that includes a prediction algorithm and a number of parameters for the prediction algorithm. An example of a prediction model is XGBoost. A confidence model is a confidence machine learning model that includes a confidence prediction algorithm and a number of other parameters for the confidence algorithm. An example of a confidence model is a logistic regression model.

Generally, a prediction model outputs a more accurate prediction when the prediction model is trained on more training data. Stated differently, the larger the available training data set, the more accurate a prediction model is at predicting an inference of interest.

In some cases, the size of the available training data set is smaller than desirable. The one or more embodiments address this technical issue by using a training method that increases the size of the available training data set. In particular, the one or more embodiments can draw on unknown data to increase the size of the available training data set. Under ordinary circumstances, unknown data cannot be used to train a prediction model, particularly a supervised prediction model, because by definition the expected prediction from the unknown data is not known. Thus, initially, there is no way to compare the result precited by the prediction model to a known result.

However, the one or more embodiments introduce the use of a confidence model into a method of self-training a prediction model. According to the one or more embodiments, a prediction model predicts predicted labels for the unknown data. A separate confidence model then predicts confidences that the predicted labels are accurate. A subset of the unknown data with confident labels (i.e., labels having predicted confidences above a threshold value) is selected for addition to the known data. The prediction model is then trained, or retrained, on a combination of the known data and the subset of unknown data. If desirable, the process can be repeated to glean increasing numbers of subsets of the unknown data for addition to the known data.

As a result, the one or more embodiments substantially increases the total amount of data available for training the prediction model. Furthermore, when the process is completed, additional training of the prediction model may not be needed, as the process of increasing the available data for training concurrently trains the prediction model. The increased amount of training data improves the accuracy of predictions made by the prediction model during deployment of the prediction model.

Attention is now turned to the figures. FIG. 1 shows a computing system, in accordance with one or more embodiments. The computing system includes a data repository (100). In one or more embodiments, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site.

The data repository (100) stores a variety of data. The data repository (100) stores accepted data (102). The accepted data (102) is data having known labels (104). A label is metadata about the accepted data (102). For example, a label may describe a type or a portion of the accepted data (102). The known labels (104) are labels which are known to be correct.

In a specific non-limiting example, if the portion of the accepted data (102) represents a login attempt, portions of the accepted data (102) may be labeled as "fraudulent" or "legitimate" to indicate whether a given login attempt was fraudulent or legitimate. In another specific non-limiting example, if the portion of the accepted data (102) represents creditworthiness, then portions of the accepted data (102) may be labeled as "creditworthy" or "uncreditworthy."

For the accepted data (102), all portions of the accepted data (102) would have known labels (104). Stated differently, it is known whether the login attempts reflected in the accepted data (102) were fraudulent or legitimate, or whether the credit applications reflected in the accepted data (102) where creditworthy or uncreditworthy. Thus, the accepted data (102) that describe login attempts has known labels (104) that indicate whether the login attempts were fraudulent or legitimate, or creditworthy or uncreditworthy.

The data repository (100) also stores unknown data (106). The unknown data (106) is of the same or similar type as the accepted data (102). The unknown data (106) is "unknown" in the sense that known labels are not available. In one case, the labels might not exist. For example, no labels are present to indicate that login attempts represented by the unknown data (106) are fraudulent or legitimate, creditworthy or uncreditworthy. Alternatively, for the unknown data (106), the labels may exist but are not trusted. For example, labels indicate whether the login attempts represented by the unknown data (106) are fraudulent or legitimate, creditworthy or uncreditworthy, but the labels are not deemed sufficiently accurate for whatever reason.

Note that the above definitions are illustrated by way of example reference to login attempts. However, the one or more embodiments contemplate many different types of data and labels for the data. Data may also be multiply labeled; i.e., two or more labels apply to each portion of data within a given data set. Thus, the one or more embodiments are not limited to the example of login attempts.

The unknown data (106) also includes a predicted label (108) among multiple predicted labels (110). The predicted label (108) is a label which has been predicted by a machine learning model. In particular, as described further below, a prediction model outputs the predicted label (108) as part of the training process described further with respect to FIG. 2 and exemplified by FIG. 5. Each portion of the data relating to an event may have a predicted label (108); thus, it is expected that the unknown data (106) may have multiple predicted labels (110).

A confidence score (112) is assigned to the predicted label (108). Similarly, multiple confidence scores (114) are assigned to the multiple predicted labels (110) on a one to one basis. The confidence score (112) is a prediction by a confidence model that the predicted label (108) correctly predicts the label for the portion of the unknown data (106).

Thus, for example, a confidence model may predict a confidence score of 0.9 that a predicted label for a given login attempt is correctly labeled as fraudulent or that a credit application is uncreditworthy. The value of 0.9 represents a 90% estimated probability that the login attempt, represented by the corresponding portion of the unknown data (106), was fraudulent or uncreditworthy.

The confidence score (112) and the multiple confidence scores (114) may be compared to a threshold value (115). The threshold value (115) is a number that reflects a judgement that a given confidence score (112) is high enough such that the portion of the unknown data (106) to which the predicted label (108) applies is considered trustworthily labeled. The threshold value (115) may be set by a computer scientist or by another machine learning process.

Thus, for example, the confidence score (112) and/or the multiple confidence scores (114) may be compared to the threshold value (115). If a predicted label (108) has a confidence score (112) that is above the threshold value (115), then the portion of the unknown data (106) describing the event is deemed trustworthily labeled. A predicted label (108) that has a confidence score (112) that exceeds the threshold value (115) may be referred-to as a confident label (120). Thus, the multiple subsets of unknown data (118) include multiple confident labels (122).

The unknown data (106) also includes a second subset of unknown data (124) among multiple second subsets of unknown data (126). The second subset of unknown data (124) is a new subset of the unknown data (106) generated during a further iteration of the training process described with respect to FIG. 2 and exemplified in FIG. 5. Each time the method is iterated, a new subset of the unknown data (106) is generated, thus leading to reference to the multiple second subsets of unknown data (126). In each case, the multiple second subsets of unknown data (126) has corresponding multiple confident labels (122), on a one for one basis.

Figure 5:
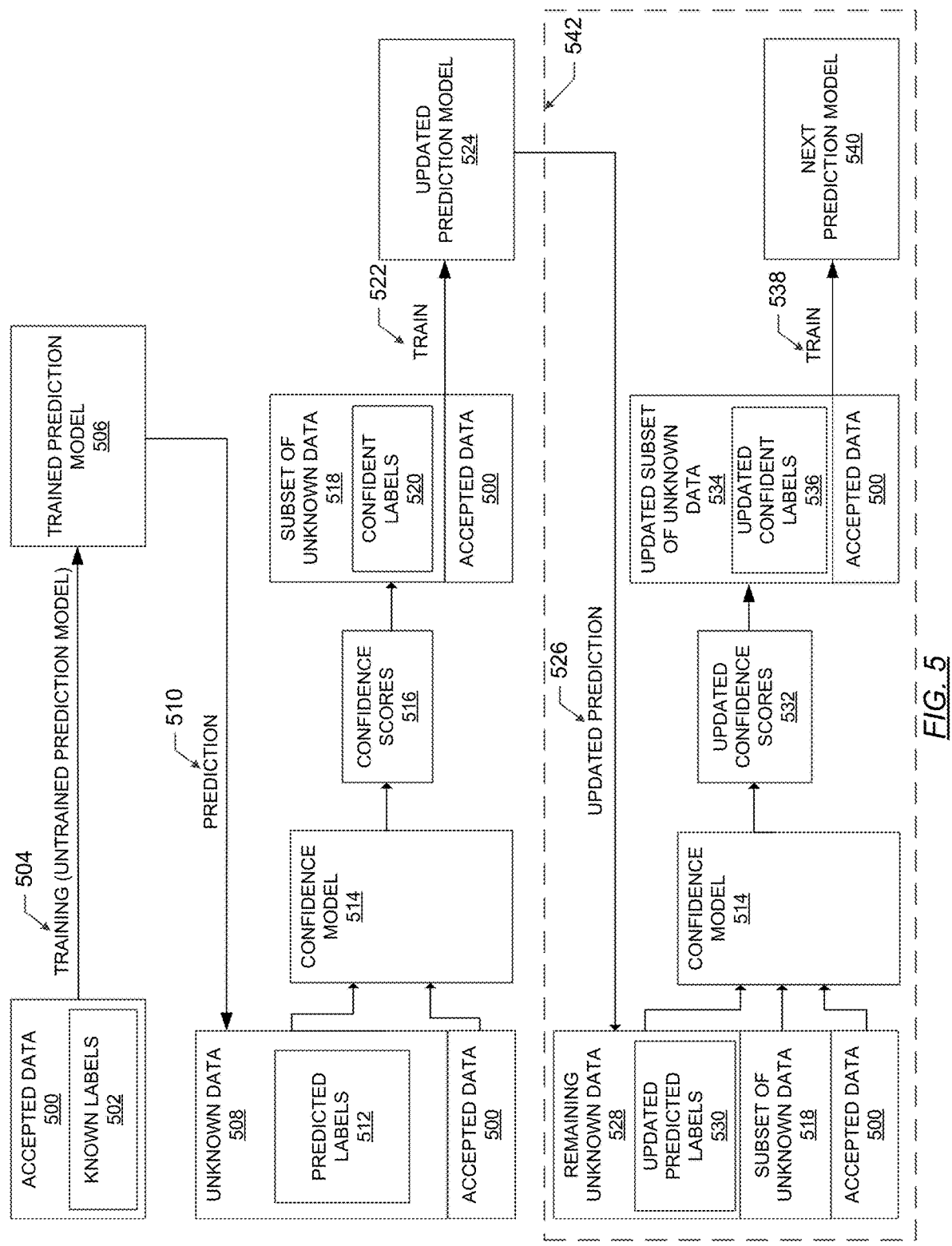
FIG. 5 is an example of machine learning training for data augmentation, in accordance with one or more embodiments of the invention.

When the process of training described with respect to FIG. 2 and exemplified by FIG. 5 is complete, augmented data (128) is generated. The augmented data (128) is the accumulated portions of the unknown data (106) for which the multiple confident labels (122) have been determined, as well as the accepted data (102). Thus, for example, the unknown data (106) may include the accepted data (102), the multiple subsets of unknown data (118), and the multiple second subsets of unknown data (126). In some applications, the unknown data (106) may be much larger than the accepted data (102). Thus, the augmented data (128) may be substantially larger than the accepted data (102).

The data repository (100) may also store remaining unknown data (130). The remaining unknown data (130) is that portion of the unknown data (106) for which a confident label (120) has not been generated. Stated differently, after the process described with respect to FIG. 2 and exemplified by FIG. 5 is completed, the unknown data (106) is separated into two components: the augmented data (128) and the remaining unknown data (130). The remaining unknown data (130) is not part of the augmented data (128).

The system shown in FIG. 1 also includes a server (132). The server (132) is a computer that interacts, possibly via a network, with the data repository (100) and possibly other components. The server (132) includes a processor (134), which is one or more computer processors configured to execute various applications, such as a training application (136), a server application (138), an untrained prediction model (140), a trained prediction model (142), a confidence model (144), and an updated prediction model (146) among possibly multiple updated prediction models (148).

The training application (136) is software that, when executed, trains the untrained prediction model (140) according to the method described with respect to FIG. 2 and exemplified by FIG. 5. The training application (136) may also perform other training of other machine learning models, as described with respect to FIG. 4. Additional aspects of the training application (136) are described with respect to FIG. 1B.

The server application (138) is software that, when executed, uses the updated prediction model (146) in service. An example of the updated prediction model (146) used in service is described with respect to FIG. 6.

The untrained prediction model (140) is a classification machine learning model prior to training. In an example, the untrained prediction model (140) is a supervised machine learning model. In particular, the untrained prediction model (140) may be XGBoost, though other types of machine learning models may be used.

The trained prediction model (142) is the untrained prediction model (140) after initial training on the accepted data (102). Note that at each training step performed in the course of the training method described herein, a newly trained machine learning model is formed; however, such intermediate and final machine learning models are provided with different nomenclature, as described below, for the purposes of clarity.

As indicated above, the process of training a machine learning model involves executing the machine learning algorithm to generate a prediction, comparing the prediction to a known result, determining a loss function adjusting parameters (such as weights) for the algorithm in a manner estimated to bring the next prediction closer to the known result, re-executing the machine learning algorithm with the adjusted parameters, and iterating these steps until convergence. Convergence is defined further with respect to FIG. 1B.

The process of training thus changes the parameters of the machine learning model. As a result, the machine learning model after training is not the same as the machine learning model before training, even if the machine learning algorithm has not changed between iterations. For this reason, a transformation occurs: The untrained prediction model (140) is transformed into the trained prediction model (142). In a real sense, the trained prediction model (142) is a new model relative to the untrained prediction model (140). The untrained prediction model (140) and the trained prediction model (142) will produce different predictions from the same underlying data, and thus the two models are different.

The confidence model (144) is another machine learning model, different from either the untrained prediction model (140) or the trained prediction model (142). In an embodiment, the algorithm for the confidence model (144) is different than the algorithm for the untrained prediction model (140) and/or the trained prediction model (142). For example, the confidence model (144) may use a logistic regression algorithm with parameters that are different from the parameters specified for the algorithm used for the untrained prediction model (140) and/or the trained prediction model (142). In any case, the confidence model (144) is trained to predict the multiple confidence scores (114) for the multiple predicted labels (110), as defined above. Training of the confidence model (144) may be performed according to the method described with respect to FIG. 4.

The updated prediction model (146) is the trained prediction model (142) after at least one iteration of the method described with respect to FIG. 2 and exemplified with respect to FIG. 5. The updated prediction model (146) may be, in one example, formed by retraining the trained prediction model (142) after adding the subset of unknown data (116) to the accepted data (102) to form augmented data (128). The updated prediction model (146) may be, in another example, formed by training the untrained prediction model (140) after adding the subset of unknown data (116) to the accepted data (102) to form augmented data (128). The updated prediction model (146) may be, in still another example, earlier iterations from among multiple updated prediction models (148) that may be generated as part of the process described with respect to FIG. 2 and exemplified by FIG. 5.

The updated prediction model (146) may be the final prediction model that is deployed for predicting live data. In this case, the updated prediction model (146) may be referred to as a "deployed prediction model" or as a "final prediction model".

Live data is defined as data that is received after training the deployed prediction model. Live data has unknown labels, and is the data of interest for which predicted labels are desired in order to make other automated decisions. For example, live data could be a credit application submitted by a loan applicant. The deployed prediction model is executed on the live data to predict a label as to whether the credit application is fraudulent or legitimate, creditworthy or uncreditworthy. If the predicted label is "fraudulent" or "uncreditworthy," then the "other automated decision" may be to deny the credit application.

The system shown in FIG. 1 may have other components. For example, a developer device (150) may execute a developer application (152). The developer device (150) is used by a computer scientist or technician to manipulate various aspects of the server (132) or the applications executable on the server (132). The developer application (152) is a tool the developer uses to perform such activities. Thus, the developer may cause the developer device (150) to execute the developer application (152) in order to program the methods and data structures described herein.

The system may also include a user device (154) programmed to execute a user application (156). The user, as defined herein, is an individual who submits live data. The user device (154) may be, for example, a personal computer and the user application (156) may be a web browser or other interactive application. An example of the use of the user device (154) and the user application (156) is described with respect to FIG. 6.

Figure 1B:
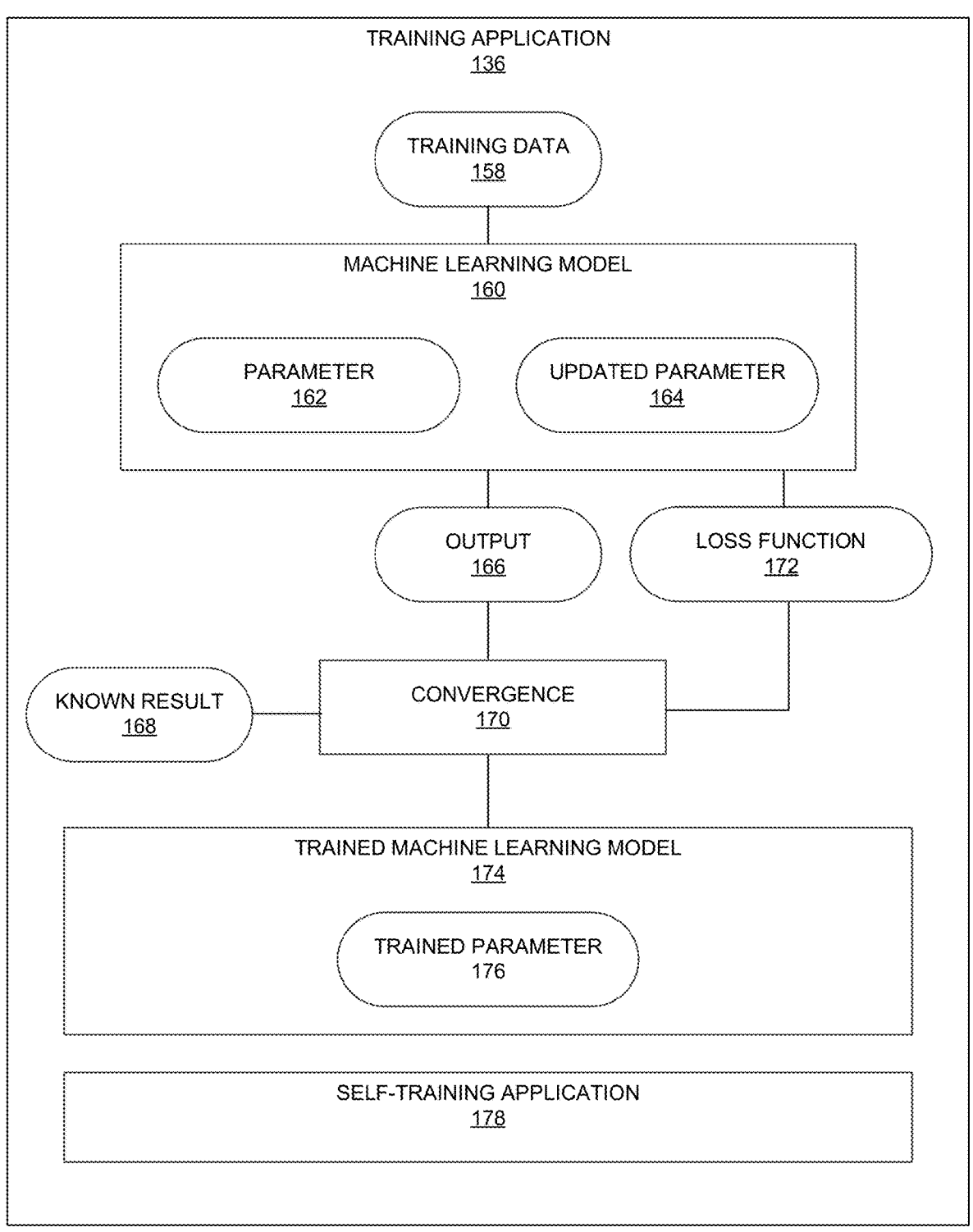

Attention is now turned to FIG. 1B. FIG. 1B defines additional details with respect to the training application (136) mentioned with respect to FIG. 1A. FIG. 1B is read together with FIG. 4 to understand the details of training a machine learning model, generally.

The training application (136) uses training data (158) to train a machine learning model (160). The training data (158) is a data set for which labels are known or reliably predicted. Thus, examples of the training data (158) include the accepted data (102), the subset of unknown data (116), the multiple second subsets of unknown data (126), and the augmented data (128) described with respect to FIG. 1A.

Note that the training data (158) may be segmented into portions, each of which has a corresponding label. For example, the training data (158) may describe the credit applications of 10,000 users, but each application has a variety of different data describing an individual application. Each credit application represents a portion of the training data (158). However, a single label (e.g., fraudulent or legitimate, creditworthy or uncreditworthy) may be applied to a given credit application (the portion of the training data (158)). Note, however, that in some cases a single datum may be deemed a "portion" of the training data (158), and a label assigned to that datum.

The machine learning model (160) is any machine learning model being trained. Thus, the machine learning model (160) may be the untrained prediction model (140). However, the machine learning model (160) could also be the trained prediction model (142), which itself is trained during iterations of the method described with respect to FIG. 2 and exemplified by FIG. 5. The machine learning model (160) could also be one of the intervening multiple updated prediction models (148), and may also be the confidence model (144) prior to training.

The machine learning model (160) includes at least one parameter (162). In some cases the machine learning model (160) may include multiple parameters. The parameter (162) is a programmable setting that the machine learning algorithm refers to during execution of the machine learning algorithm. An example of the parameter (162) may be a weight, but the nature of the parameter (162) varies depending on the type of the machine learning model (160).

The machine learning model (160) also includes at least one updated parameter (164) during the training process. The updated parameter (164) has a value that may be changed relative to the parameter (162). The updated parameter (164) is changed during the training process, as described with respect to FIG. 4.

The result of executing the machine learning model (160) is an output (166). The output (166) is a prediction that a portion of the training data (158) is associated with a particular label. The output (166) may be multiple predictions of multiple labels corresponding to multiple portions of the multiple updated prediction models (148).

Whatever the form of the output (166), the output (166) is compared to a known result (168). As described with respect to FIG. 4, a determination is made whether a convergence (170) has occurred. The convergence (170) occurs when the difference (between output (166) and the known result (168)) on a past iteration is insufficiently different from the difference (between output (166) and the known result (168)) on the current iteration. The term "insufficient" is defined by a number referred to as a convergence threshold. Stated more simply, the convergence (170) occurs when the difference between the output (166) and the known result (168) does not change sufficiently between training iterations.

If the convergence (170) has not occurred, then a loss function (172) is generated. The loss function (172) is a calculated estimation of how the parameter (162) and/or the updated parameter (164) should be adjusted in order to change the output (166) to be closer to the known result (168). The loss function (172) may apply to multiple parameters.

The result of training is a trained machine learning model (174). The trained machine learning model (174) uses the same machine learning algorithm as the machine learning model (160), but the trained machine learning model (174) uses a trained parameter (176) (or set of multiple parameters). As described above, the trained machine learning model (174) is, in a real sense, different from the machine learning model (160).

The training application (136) also includes a self-training application (178). The self-training application (178) is software which, when executed by the server (132), causes the method of FIG. 2 or FIG. 5 to be performed.

While FIG. 1A and FIG. 1B show exemplary configurations of components, other configurations may be used without departing from the scope of the one or more embodiments. For example, various components may be combined to create a single component. As another example, the functionality performed by a single component may be performed by two or more components.

Figure 3:
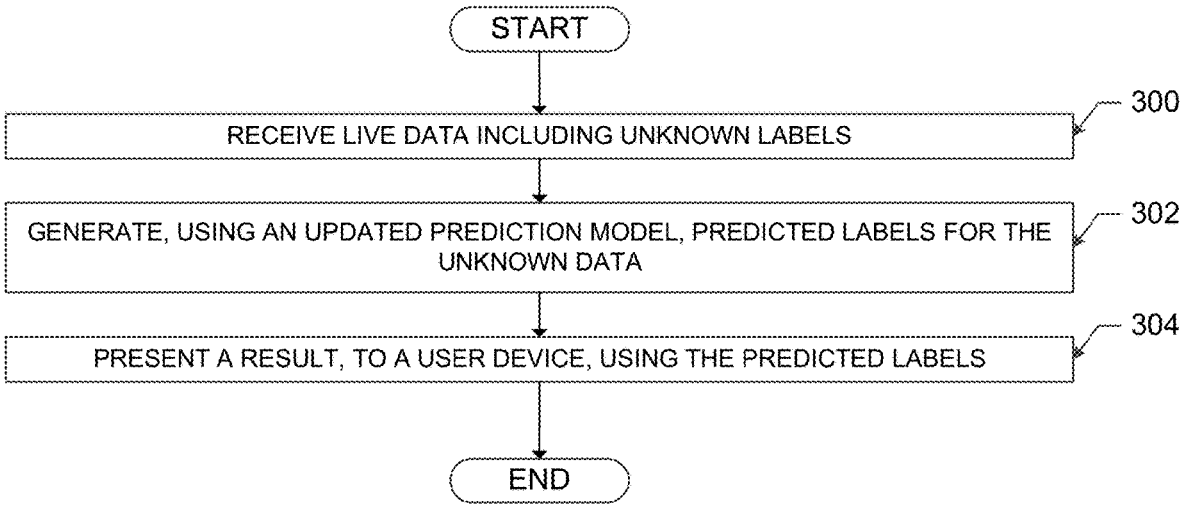
FIG. 3 is a flowchart of a method for using a trained machine learning model, in accordance with one or more embodiments of the invention.

FIG. 2 and FIG. 3 are flowcharts, in accordance with one or more embodiments. In particular, FIG. 2 is a method of self-training a prediction model to increase the available training data. FIG. 3 is a method of using a trained prediction model that has been trained according to the method of FIG. 2. The method of FIG. 2 may be executed using the training application (136) of FIG. 1A and the self-training application (178) of FIG. 1B. The method of FIG. 3 may be executed using the server application (138) of FIG. 1A.

Turning first to FIG. 2, step 200 includes training, using accepted data having known labels, an untrained prediction model to generate a trained prediction model. Training the untrained prediction model may be performed as described with respect to FIG. 4.

Step 202 includes generating, using the trained prediction model, predicted labels for unknown data. In particular, the input to the trained prediction model is the unknown data. The trained prediction model is executed on the unknown data. The output of the trained prediction model is the predicted labels.

Step 204 includes generating, using a confidence model, confidence scores for the predicted labels. In particular, the input to the confidence model is the confidence scores and the unknown data. The accepted data may also be provided as input to the confidence model. The confidence model is provided on the above-described input. The output of the confidence model is the confidence scores.

Step 206 includes selecting, using the confidence scores, a subset of the unknown data and confident labels. The confident labels are ones of the predicted labels for the subset of the unknown data. More specifically, using the confidence scores entails, initially, comparing the confidence scores to a confidence threshold. Those labels who have confidence scores that are above the confidence threshold are deemed to be confident labels. Then, the subset of the unknown data is selected by logically separating that portion of the unknown data which correspond to the confident labels. Thus, step 206 may include the further details of selecting, as the confident labels, ones of the predicted labels having predicted label values that exceed a threshold value; and selecting, as the subset of the unknown data, portions of the data corresponding to the confident labels.

Step 208 includes training, using the subset of the unknown data and the confident labels, the trained prediction model to generate an updated prediction model. The training at step 208 may be performed according to the method described with respect to FIG. 4. However, what has changed is the amount of training data. The training data now includes at least the subset of the unknown data. Unlike prior self-training methods, the one or more embodiments thus present a method of using unknown data to self-train a supervised machine learning model, which ordinarily cannot be performed. However, in most cases, the accepted data also will be used as the training data set; thus, the overall amount of available training data can be substantially increased via the resulting augmented data.

Note that training at step 208 may be performed by training the untrained machine learning model, but now using the augmented data. Thus, the newly trained prediction model will be different from the originally trained prediction model.

However, training step 208 may also be performed by re-training the trained prediction model. In some cases, retraining may be preferred as the accuracy of the prediction model may improve each time the prediction model is retrained.

Thus, for example, step 208 may be characterized as further training the trained prediction model using the accepted data, wherein the subset of the unknown data, the confident labels, and the accepted data together are augmented data. Step 208 may include training the untrained prediction model with the subset of the unknown data and the confident labels to generate the updated prediction model.

The method of FIG. 2 may be reiterated multiple times. Each time, a new subset of the unknown data is added to the augmented data and each time the prediction model is trained (or retrained) to form the updated prediction model. This procedure is described further below and is further elucidated with respect to FIG. 5.

The method of FIG. 2 may be varied. As mentioned above, after a first iteration of the method of FIG. 2, the augmented data may be further augmented by repeating the method on the remainder of the unknown data. Thus, the method of FIG. 2 may also include generating, using the updated prediction model, other predicted labels for an other portion of the unknown data outside of the subset. Then, the method may also include generating, using the confidence model, other confidence scores for the other predicted labels. Then, the method may also include selecting, using the other confidence scores, other confident labels and a second subset of the other portion of the unknown data. The other confident labels include ones of the other predicted labels for the second subset. Then, the method includes training, using the second subset and the other confident labels, the updated prediction model to generate a newly updated prediction model.

Still other variations are possible. As mentioned above, the method may include iteratively generating the prediction labels, generating the confidence scores, selecting the subset of unknown data, and training the updated prediction model, until a stop condition occurs. The stop condition may be a pre-determined number of iterations, in one variation. In another variation, the stop condition may be finding less than a remainder threshold number of updated confidence scores that are above a stop threshold value. In other words, once the remainder amount of unknown data fails to change in size by more than a predetermined amount or percentage, then the stop condition may exist.

The updated prediction model trained according to the method of FIG. 2 may be deployed after training. Thus, the method of FIG. 2 may be extended into deployment, which includes deploying the updated prediction model to an enterprise environment, receiving live data, and predicting, using the updated prediction model, live prediction labels for the live data. In an exemplary use case, the live prediction labels may be an evaluation of credit risk for users from whom the live data was received. In another exemplary use, the live prediction labels may be an evaluation of whether the use is deemed fraudulent or legitimate. In still another exemplary use, the live prediction labels may be an evaluation of whether a credit application is creditworthy or uncreditworthy.

Attention is now turned to FIG. 3. The method of FIG. 3 is an example of using the predicted model trained by the method described with respect to FIG. 2.

Step 300 includes receiving live data having unknown labels. The live data is received from users interacting with local applications, such as web browsers or possibly custom input entry software. The live data could also be received from an intermediary. For example, users may interact with a remote server, which passes the live data to the local server for processing.

Step 302 includes generating, using an updated prediction model, predicted labels for the unknown data. The updated prediction model was trained according to the method of FIG. 2. Briefly, that method included training, using accepted data having known labels, an untrained prediction model to generate a trained prediction model; generating, using the trained prediction model, predicted labels for unknown data; generating, using a confidence model, confidence scores for the predicted labels; selecting, using the confidence scores, a subset of the unknown data and confident labels, the confident labels including ones of the predicted labels for the subset of the unknown data; and training, using the subset of the unknown data and the confident labels, the trained prediction model to generate the updated prediction model.

Step 304 then includes presenting a result, to a user device, using the predicted labels. The result may be a determination whether the live data corresponds to some past event type, such as a fraudulent or legitimate use, creditworthy or uncreditworthy, the semantic classification of words, etc. The predicted labels are used by some other algorithm or set of policies for deciding what the predicted labels mean and what action should be taken.

For example, assume that the live data is a credit application received from a user device. A credit value is determined from the predicted labels. A policy then automatically determines that the credit application should be granted or rejected when the credit value exceeds a credit threshold. For example, if the labels are below one or more thresholds, then the credit application may be rejected. However, if the labels are above one or more thresholds, then the credit application may be granted. The decision is then automatically presented to the user device in the form of an indication of grant or rejection of the credit application.

Note that the above example does not necessarily limit the one or more embodiments. The improvements of the one or more embodiments related to improvements to the machine learning training process. The improved prediction model that results may be used in a wide variety of applications, including computer security, scientific research, automated word processing, etc.

Figure 4:
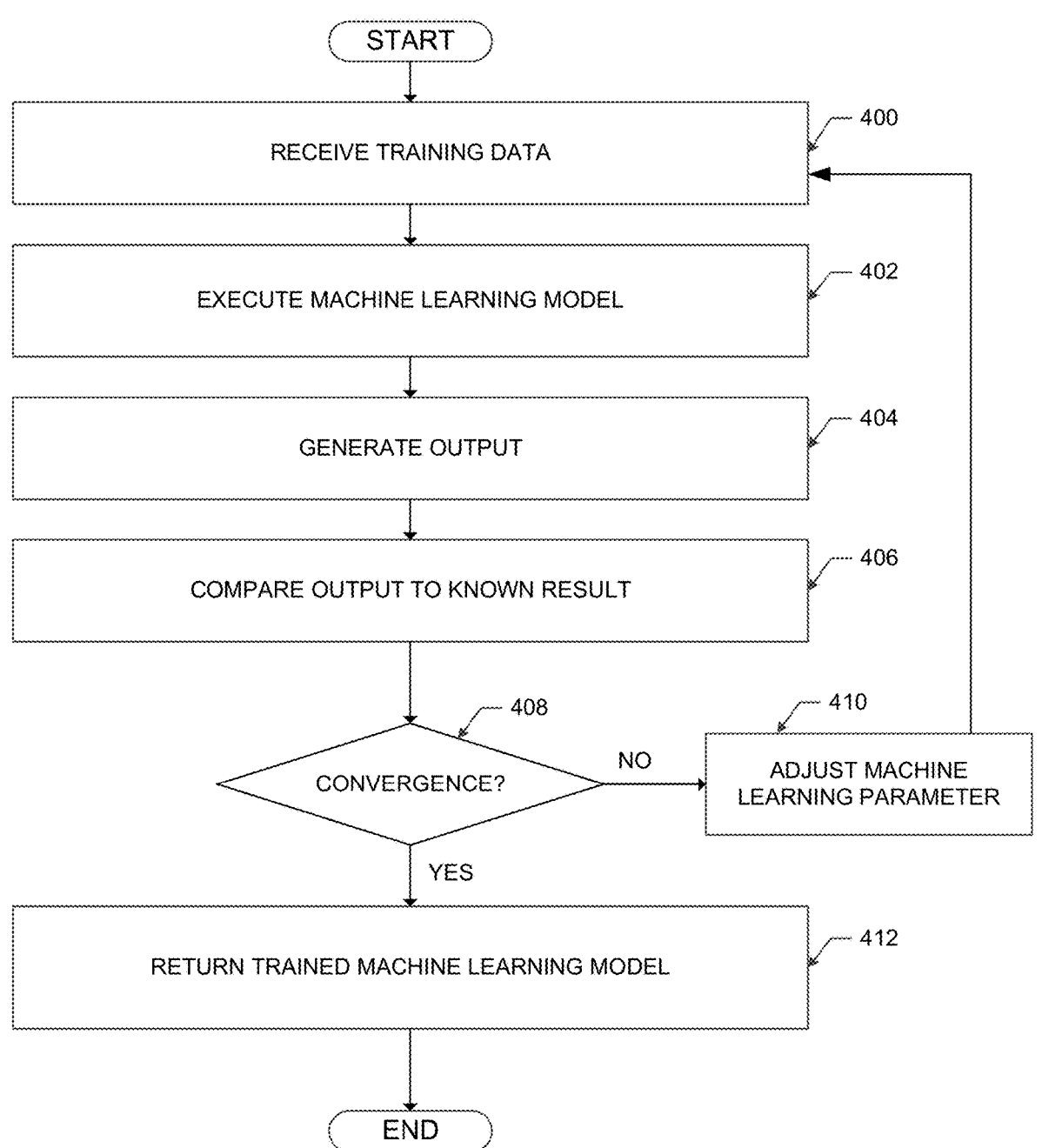
FIG. 4 is a method of training a machine learning model, in accordance with one or more embodiments of the invention.

Attention is now turned to FIG. 4. FIG. 4 describes training of a machine learning model in a general sense. Thus, the method of FIG. 4 may be used at each training step described with respect to FIG. 2.

Step 400 includes receiving training data. The training data is received from a data repository, which may or may not be remote from the computer performing the training method. Again, the training data has known labels.

Step 402 includes executing a machine learning model. In particular, one or more parameters for the machine learning model are set or pre-set. The machine learning algorithm is then executed, taking as input the training data received at step 400.

Step 404 includes generating output. The output is the result of execution of the machine learning algorithm on the training data with the one or more parameters defined above.

The details of the machine learning algorithm depend on the type of machine learning model. For example, the algorithm could be logistic reaction, a neural network, a gradient boost algorithm, and many other possible machine learning algorithms.

Step 406 includes comparing the output to a known result. Thus, for example, the output is a predicted label, which is compared to the known label. Because the labels are expressed as numbers, a difference can be determined between the predicted labels and known labels.

Step 408 includes determining whether convergence has occurred. Convergence occurs when the difference between the predicted labels and known labels is either zero (i.e., a perfect match), or when the predicted label has changed less than a pre-determined amount (i.e., the convergence threshold).

If convergence does not occur (a "no" determination at step 408), then step 410 includes adjusting the machine learning parameter (or adjusting multiple parameters). Adjusting the machine learning parameter is determined automatically. The machine learning parameter may be incremented. The machine learning parameter may be changed by an amount determined by a function which takes as input the comparison value determined at step 406. The machine learning parameter may be changed according to some other policy which is predicted to lessen the difference between the next predicted result and the known result. However, the one or more machine learning parameters are adjusted, the method then returns to step 400 and iterates.

Returning to step 408, if convergence has occurred (a "yes" determination at step 408), then step 412 includes returning the trained machine learning model. Returning the trained machine learning model may include storing the trained machine learning model for future use. Returning the trained machine learning model may include presenting the trained machine learning model for further training, as described above with respect to FIG. 2 and exemplified by FIG. 5. Returning the trained machine learning model may include deploying the trained machine learning model.

While the various steps in the flowcharts of FIG. 2, FIG. 3, and FIG. 4 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

Figure 6:
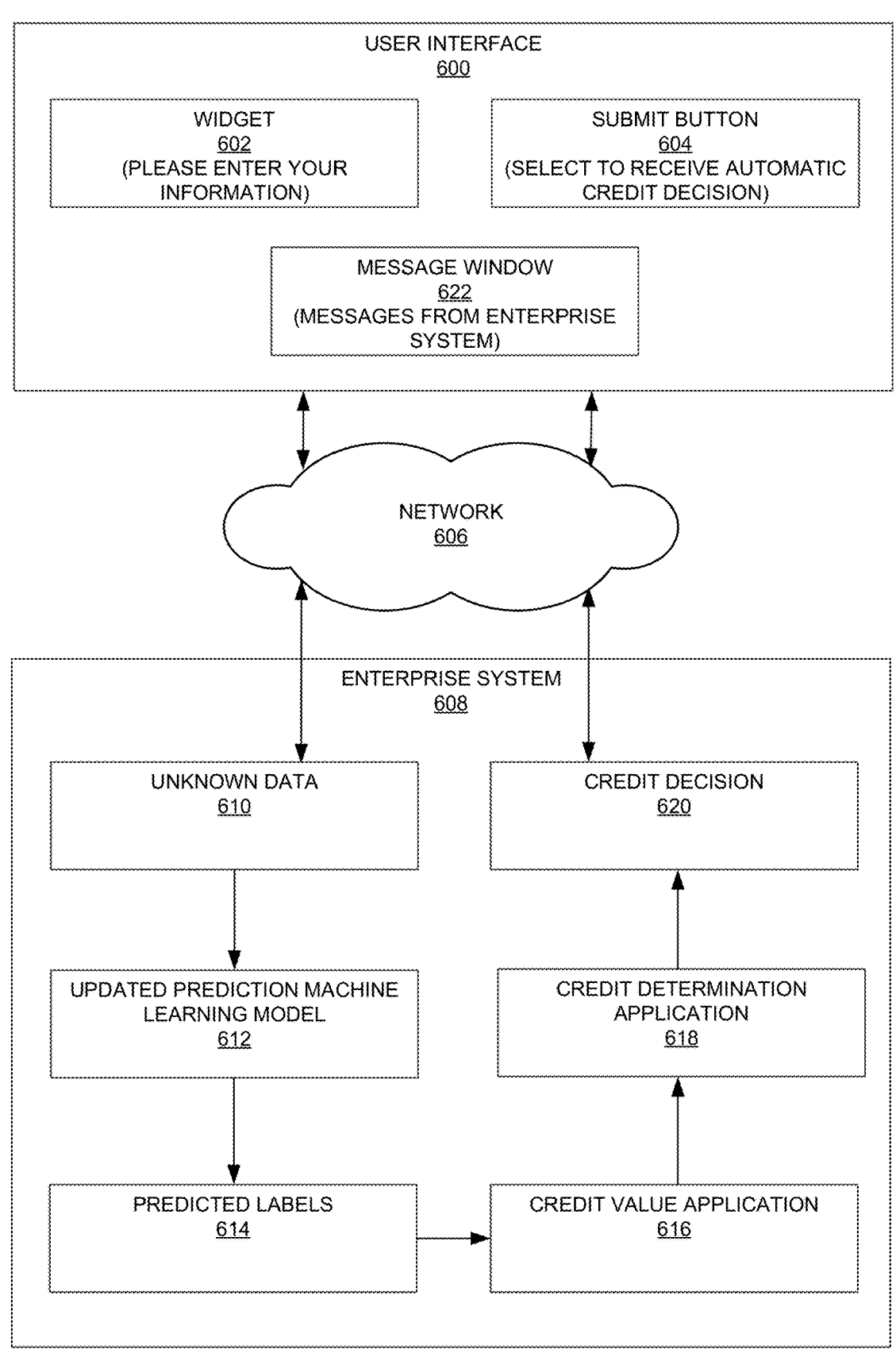
FIG. 6 is an example of a system for using the machine learning model trained as descried herein, in accordance with one or more embodiments of the invention.

FIG. 5 and FIG. 6 present a specific example of the techniques described above with respect to FIG. 2 and FIG. 3, respectively. The following examples are for explanatory purposes only and not intended to limit the scope of the one or more embodiments.

FIG. 5 is an example of machine learning training for data augmentation, in accordance with one or more embodiments of the invention. The method of FIG. 5 may be performed using the system described with respect to FIG. 1A and FIG. 1B.

Initially, accepted data (500) having known labels (502) are used for training (504) an untrained prediction model. In this example, the model is a supervised machine learning model, such as XGBoost. The process of training may be accomplished according to the method described with respect to FIG. 4. Training established a trained prediction model (506).

However, as indicated above, it is desirable to expand the available training data. In some cases, a much larger data repository of unknown data (508) is available. The unknown data (508) is of a similar type to the accepted data (500). For example, the accepted data (500) may be past login attempts that have been correctly labeled as fraudulent or legitimate, and the unknown data (508) may be other past login attempts whose fraudulent or legitimate nature is not known. Similarly, the accepted data (500) may be past credit applications that have been correctly labeled as creditworthy or uncreditworthy, and the unknown data (508) may be other past credit applications whose creditworthiness is not known.

However, ordinarily, it is not possible to train a supervised machine learning model on unknown data (508), because the unknown data does not have known labels (502). The one or more embodiments address this technical issue by increasing the size of the training data from the ordinarily unavailable unknown data (508). Note that while the one or more embodiments are particularly useful with respect to increasing the available training data for a supervised model, the one or more embodiments can also be used to train unsupervised models.

Thus, the one or more embodiments begin by using the trained prediction model (506) to predict (510) predicted labels (512) for the unknown data (508). Thus, continuing the above example, the trained prediction model (506) is executed on the unknown data (508) of past login attempts. The output of the trained prediction model (506) is predicted labels that the past login attempts are fraudulent or legitimate, or that a credit application is creditworthy or uncreditworthy. Typically, the output is a string of numbers between 0 and 1 that indicate a predicted probability that a given past login attempt is fraudulent, or that a given past credit application is creditworthy. The labels can be stored as the string of numbers, which are associated with the past login attempts described in the unknown data (508).

However, merely predicting the predicted labels (512) may not necessarily be reliable enough to retrain the trained prediction model (506) or to train the untrained prediction model on the unknown data (508). Thus, in this example, a confidence model (514) is introduced. The confidence model (514) in this example is a logistic regression model.

The confidence model (514) takes, as input, at least the unknown data (508) with the predicted labels (512). The accepted data (500) may also be used with the unknown data (508) as input to the confidence model (514).

The output of the confidence model (514) is predicted confidence scores (516) for the predicted labels (512). The confidence scores (516) are a string of numbers between 0 and 1 that predict or estimate the probability that the predicted labels (512) are correct.

Only those predicted labels (512) with sufficiently high confidence scores (516) are selected, in order to increase the reliability of the increased training data set. A threshold number is set for this purpose. The threshold is set by a computer scientist, or possibly by some other automated machine learning process. For example, only those confidence scores (516) which meet or exceed 90% (0.9) could be deemed acceptable. Those ones of the predicted labels (512) that meet or exceed the threshold are called confident labels (520).

The portions of the unknown data (508) corresponding to the confident labels (520) is then extracted from the unknown data (508). The extracted data is a subset of unknown data (518). Theoretically, the subset of unknown data (518) could be the entire set of unknown data (508); however, in practice, the subset of unknown data (518) is usually significantly smaller than the size of the unknown data (508).

At a minimum, the subset of unknown data (518) is used in a new training step, training step (522), to establish an updated prediction model (524). The accepted data (500) may also be used together with the subset of unknown data (518) during the training step (522). In this case, the combination of the accepted data (500) and the confident labels (520) may be termed augmented data.

The training step (522) itself may be performed according to the method described with respect to FIG. 4. However, because the augmented data (or subset of unknown data (518)) is different from the original accepted data (500), the updated prediction model (524) is different from the trained prediction model (506). In particular, the updated prediction model (524) has one or more different parameters set relative to the updated prediction model (524).

The process described between the label prediction (510) and the updated prediction model (524) may be repeated. Thus, for example, the updated prediction model (524) may perform an updated prediction (526) on the remaining unknown data (528) to establish updated prediction labels (530).

The remaining unknown data (528) is the portion of the unknown data (508) that remains after the subset of unknown data (518) has been extracted from the unknown data (508). The remaining unknown data (528) may be up to all of the unknown data (508). However, it may be assumed that the subset of unknown data (518) with the confident labels (520) is trustworthily labeled due to the intervening use of the confidence model (514) and thresholding process described above. Thus, the updated prediction model (524) may be executed on the remaining unknown data (528) to output the updated predicted labels (530). As with the similar step above, the updated predicted labels (530) are a string of numbers that predict a probability that the login attempts of the remaining unknown data (528) are fraudulent, or that a credit application is creditworthy or uncreditworthy.

Then, at a minimum, the remaining unknown data (528) is provided as input to the confidence model (514). Note that the confidence model (514) may be the same as the confidence model (514) used to predict the confidence scores (516) described above. One or both of the subset of unknown data (518) and the accepted data (500) also may be provided as input to the confidence model (514).

The output of the confidence model (514) is the updated confidence scores (532). The term "updated" is used because the updated confidence scores (532) are different from the confidence scores (516), even if portions of the remaining unknown data (528) already had corresponding confidence scores (516). The updated confidence scores (532) are now used in place of the confidence scores (516).

Again, the updated confidence scores (532) is applied to the threshold described above. However, a different threshold could be used. The updated subset of unknown data (534) with their updated confident labels (536) is extracted from the remaining unknown data (528). The updated subset of unknown data (534) is that portion of the remaining unknown data (528) with updated confidence scores (532) that are above the threshold. Stated differently, the updated subset of unknown data (534) is that portion of the data corresponding to the updated confident labels (536).

At a minimum, the training step (538) is used in a new training step (538) to train the next prediction model (540). The accepted data (500) and/or the subset of unknown data (518) may also be included in the new training data. Together, the new training data being used may be referred to as updated augmented data. The actual training performed during the training step (538) may proceed according to the method described with respect to FIG. 4.

The process described within the dashed box (542) may be repeated until a stop condition is reached. A stop condition may take several different forms. The stop condition may be a pre-defined number of iterations of the process. The stop condition may be based on a size difference between a current updated subset of unknown data (534) and the last version of the updated subset of unknown data (534). The stop condition may be based on a minimum number of found updated confident labels (536) (i.e., if fewer than "X" number of confident labels are found, then stop).

Once the stop condition is reached, the process terminates. The final version of the next prediction model (540) (which could be the updated prediction model (524) in some embodiments) is known as a deployed model. The deployed model is then used to predict labels for live data, and take action accordingly. Continuing the above example, the deployed model may be used to continually check if incoming login attempts are deemed fraudulent. Those login attempts deemed fraudulent may result in security actions being taken to prevent further fraudulent login attempts. Another example of the use of the deployed model, with respect to creditworthiness, is described with respect to FIG. 6.

FIG. 6 is an example of a system for using the machine learning model trained as described herein, in accordance with one or more embodiments of the invention. The method of FIG. 6 may use the updated prediction model (524) or the next prediction model (540) described with respect to FIG. 5.

In the example of FIG. 6, a user is a person desiring to submit a credit application for a loan. The user uses a user interface (600) to perform the desired actions. The user interface (600) in this example is a web browser, but many different user interfaces could be used.

The user uses a widget (602) to enter personal information relevant to the loan application. The widget (602) is an interactive tool in the user interface (600), such as a dialog box, a button, a drop-down menu, a scroll wheel, etc. The widget (602) may be part of a suite of widgets.

When the user is finished entering the required credit information, the user selects a submit button (604). The data in the credit application is then sent via a network (606) to an enterprise system (608). The enterprise system (608) is a combination of hardware and various software systems that enable a business to perform electronic operations via the network (606).

The data in the credit application is treated as unknown data (610). The updated prediction machine learning model (612) is executed on the unknown data (610) in order to generate predicted labels (614) for the unknown data (610). The predicted labels (614) are provided to a credit value application (616). The credit value application (616) calculates the credit worthiness of the user based on the predicted labels (614). The credit worthiness determination or score is then provided to a credit determination application (618) to determine whether to offer the user a loan and/or the terms of the loan (interest rate, maximum loan amount, etc.). The output of the credit determination application (618) is used to create a credit decision (620), which may include the terms of the loan, reasons for rejection of the credit application, etc.

The credit decision (620) is then transmitted to a message window (622) of the user interface (600). The message window (622) displays the credit decision (620) to the user. Note that the entire process is fast, taking seconds to a minute or two. Thus, the user is able to receive an "instant" (i.e., rapid) decision on the loan application.

The example of FIG. 6 may be varied. For example, the example could relate to computer security (monitoring the type of login attempts, determining whether wire transfers of money are fraudulent, etc.). Thus, the focus of the one or more embodiments is not on financial transaction methods, but rather on the improvements to the updated prediction machine learning model (612) such that the predicted labels (614) are more accurate.

Attention is now turned to additional details of the one or more embodiments described above with respect to FIG. 1A through FIG. 6. In particular, the following description provides additional technical details.

Abstract

A significant challenge in credit risk models for underwriting is data representativeness. When credit scoring models are built using only applicants who have been accepted for credit (which is the common strategy in the industry), such a non-random sample mainly influenced by credit policy makers and previous loan performances may introduce sampling bias to the estimated credit models. The sampling bias accordingly influences the models' prediction of default on loan payment when screening applications from all borrowers. Thus, the one or more embodiments provide for data augmentation methods that identify and pseudo-label parts of declined loan applications based on the confidence level of the estimated labels to mitigate sampling bias in the training data.

Besides prevalent model performance metrics, loan application approval rates are reported at various loan default rate intervals from the business perspective. The one or more embodiments were compared to the Known Good/Bad (KGB) model and the traditional reject inference method using fuzzy augmentation. The results showed that self-training model with calibrated probability as data augmentation selection criteria improved the ability of credit score to differentiate good/bad loan applications. More importantly, the one or more embodiments increased the loan approval rate by 2.6% while keeping a similar bad rate compared to the KGB model. The results demonstrate practical implications on future underwriting model development processes.

Introduction

Financial institutions use credit scoring machine learning models to guide lending decisions for both businesses and individuals. Credit scoring models predict the probability of default, i.e., applicants' probability of not repaying their debts, from collected financial information during the application stage including applicants' loan history, payment habit, income, assets, etc. They will categorize applicants into good borrowers or bad borrowers. Traditionally, credit scoring models are trained with previously accepted applicants with their observed repayment performances under the supervised learning framework. From the perspective of data sampling, the training samples from accepted applicants are not a good representation of the through-the-door population at the time of credit underwriting. Accepted applicants are already screened by the risk scoring models and manual checks during the underwriting process. In comparison, the entire application population includes rejected applicants whose actual repayments are unknown and potential applicants who never apply. Though it is hard to consider potential applicants without any financial information, researchers have developed various techniques to infer rejected applicants into the credit scoring models to address the sampling bias. These techniques are referred to as reject inference.

Reject inference (RI) is a technique that combines accepted applicants with their repayment and rejected applicants with estimated performance into inferred data sets to generate reject inference scoring models. The one or more embodiments have two-fold approaches to accomplishing this objective. First, the one or more embodiments use two reject inference techniques to estimate the performance of applicants whose actual default statuses are unknown. One method includes a self-training method with variation on the choice of most confident of unlabeled predictions that are added to the training set. The one or more embodiments introduce probability calibration and a trust score model as confidence models to select the most confident predictions. Another method uses the idea of data programming, and initializes multiple weak classifiers to jointly label the data along with Snorkel generative models. Second, the one or more embodiments introduce a new measure (denoted as approval rate) to evaluate the performance of reject inference methods. By controlling the bad loan rate, estimated approval rate measures the percentage of cases that can be approved as an estimated business KPI. This measure considers both accepted label accuracy and also the application population. It provides us a unique metric for domain specific evaluation.

Methods

In this section, two reject inference methods are presented. Self-training method combines a self-training algorithm and a pseudo-label confidence model. Another method is introduced using multiple weak classifiers and Snorkel to predict the default status of loan applications whose performances are unlabeled.

Consider a set of n loan applications $x_1, x_2, \ldots x_n \in R^k$ where k is the number of features. This set includes m accepted applications $x_1, x_2, x_m \in x_a$ with corresponding labels $y_1, y_2, \ldots y_m \in \{Good, Bad\}$ and consists of $x_{m+1}, x_n \in X_u$ whose labels are unknown. The credit scoring model trained with $X_a$ only is denoted as Known Good/Bad (KGB) model. To mitigate sampling bias, reject inference assigns labels to unlabeled applications, and combine accepted data and pseudo-labeled data into inferred data sets to represent the whole application population and update credit scoring models. The scoring model with inferred data as training set is denoted as reject inference model (RI model).

Self-Training with Confidence Model

FIG. 5 is an overview of the self-training method pipeline. The method starts with training an initial model (also the KGB model in the first iteration) on the accepted data $X_a$ and uses it to predict all the unlabeled data. Then, a confidence model is introduced to select an unlabeled data $X_u$ with a fine-tuned threshold to filter the most confident predictions whose labels are good or bad. The selected unlabeled data are labeled in accordance with the predictions, and the training set is augmented with new labeled data, denoted as $X_a^1$. Then the RI model is retrained with labeled data $X_a^1$. This process is repeated, and the RI model and confidence model update every iteration along with labeled data $X_a^j$. The process may continue until no confident applications are identified from confidence model or may stop upon reaching a pre-defined number of rounds as stopping criteria.

The one or more embodiments may use two confidence models to accommodate the attributes of different algorithms for reject inference: a trust score confidence model and a probability calibration model. The self-training procedure involves selecting confident predictions whose prediction probabilities p satisfy $p > \alpha$ or $p < 1 - \alpha$, where a is a probability threshold. However, many algorithms, such as Naive Bayes, state vector machine, and random forest, tend to yield a characteristic sigmoid-shaped distortion in predicted probabilities. The one or more embodiments probability calibration confidence model adds isotonic probability calibration and uses calibrated probabilities to filter confident predictions. The trust score confidence model, on the other hand, provides prediction accuracy from the nearest neighboring approach. For a predicted test label, the trust score is the ratio between the distance from the test label to the nearest class different from the predicted label class and the distance to the predicted label class. The trust score is based on a small set of labeled data training set without outliers in our work. A high score implies high prediction accuracy since the predicted case is close to labeled data with the same label class.

From empirical results, probability calibration shows a significant improvement in maximum margin methods, such as XGBoost, the one used in our experiment. And Trust Score works as an alternative of algorithms' own confidence scores from initial feature space and training set.

3 Experiments

3.1 Data

An experiment was carried out using loan data from a lending business which has offered business loans to small business accounting software users. The loans are repaid weekly, bi-weekly, or monthly over a period of six, nine, or twelve months.

Over three years, hundreds of thousands of loan applications were submitted, and tens of thousands of loans have been issued. Over a quarter of issued loans reached maturity. Those issued loans still in the process of repayment and those that were declined previously, representing vast majority of all loan application population, were not included in the credit risk models due to lack of loan performance history. A number of features are derived corresponding to account balance patterns, cash flow trends, composition of recurring liabilities, seasonality and other spending patterns, frequency of negative financial events such as overdrafts and late payments, etc. For this research, the lending business provided a random and anonymous sample of loan applications with sufficiently large sample size to ensure the representativeness of the population.

Hundreds of features were extracted from bank transactions and data describing how users' bureau data was processed. The features were passed through an internal data pipeline. The data was intrinsically noisy. Some of the noises are introduced by information representation and transmission of bank data, inaccurate recording of business bureau data, and significant variability due to the differences in the nature of business among loan applicants.

After feature engineering, the entire dataset was split into a training set and a test set according to the loan application date. For a better evaluation on more representative test applications including both accepted loans and rejected applications, the labeled test data was extended by resorting performance data from bureau tradeline performance where part of loan applicants' credit history were retrieved around the same time of loan applications. Stringent matching criteria were used in order to maximally eliminate false positive matches, such as requiring a relatively narrow matching window, matching tradelines whose types and days past due were similar to a known loan population only. Eventually, about 13% of data in the test set was labeled by the process.

To further validate the quality of data matching between bureau tradelines and loan data, a confusion matrix between bureau data and existing labeled loan data was calculated. Results show that the matching quality is satisfactory as shown in Table 1. About 97% of the data were matched correctly when compared to known results.

TABLE 1

|  | Good | Bad |
|---|---|---|
| Good | 91% | 0% |
| Bad | 3% | 6% |

3.2 Loan Outcomes

The outcome of a credit decision is not fully known until the loan has matured and either the full amount due is repaid in the expected time or what is repaid is a partial amount and/or over a much longer period of time. A loan is defined to be in good standing when timely payments are being made, or payments are less than 60 days past due. Using this definition, loan outcomes are simplified as follows.

Good Outcome—loans are all those loans still in good standing which will mature in 30 days plus all those loans already repaid in full.

Bad Outcome—loans are all the rest—the ones that are delinquent (60+ days past due) plus the loans not fully repaid (write-offs due to charge off).

Unknown Outcome—loans are those in good standing which will mature in more than 30 days, approved but not taken by applicants or declined due to applicants' creditworthiness.

3.3 Choice of Credit Risk Model

Experiments using different prediction models found that a gradient boosted tree algorithm (XGBoost) provided the best model performance among several candidate algorithms. Simultaneously, monotonic constraints on inputs provided explanations on the predicted score in conjunction with Shapley values. The hyperparameters (which are model "parameters" as defined above) used in XGBoost were determined by Amazon Sagemaker XGBoost hyperparameter tuning using Bayesian search. For comparison purposes, XGBoost was selected as the choice of credit risk prediction models for all the methods throughout the experiment 3.4 Benchmark Models Two benchmark models were adopted in this experiment: a Known Good/Bad model that does not have any sampling correction, and a fuzzy argumentation method as representative of reject inference techniques. The Known Good/Bad XGBoost model is trained with only accepted applicants.

Fuzzy argumentation involves assigning labels to unlabeled data based on the KGB model and retraining to get the RI model. Fuzzy argumentation assigns unknown data as being partial Good and partial Bad by labels and weights. Every application in $X_u$ is duplicated as two records with two labels y: (1) y1=Good with weight p(Good); and (2) y2=Bad with weight p(Bad). The weights p(Good) and p(Bad) are predicted probabilities based on KGB model. The sum of two weights is equal to 1. Accepted applications are also weighted by 1. Then the RI model was constructed on weighted data.

3.5 Evaluation Metrics

Both the benchmarks and the one or more embodiments were tested on the same test set to ensure a fair comparison. The area under the curve (AUS) and K-S metric were used to compare the performances. Note that both metrics do not depend on the selection of classification thresholds, making them attractive as evaluation metric in the context of credit risk domain.

Approval rate besides domain-independent evaluation metrics, a new evaluation metric from a business KPI perspective was introduced: approval rate. In general, when more applications are approved, more loans with bad outcome will be introduced. For a given risk score threshold $t(p)$ where p is the pre-defined bad rate, the approval rate is calculated as:

$$\text{Approval rate} = (\text{number of applications with score} \leq t(p))/(\text{number of applications}).$$

Note that the calculation of the approval rate is based on both the labeled test set and the unlabeled test data. Refer to graph (700) in FIG. 7 for an illustration of risk score distribution and how the distribution is related to an approval rate calculation. Given the test data, predicted risk score, and a specific risk score threshold, the numerator of approval rate is the size of data whose risk score is lower than the threshold. The corresponding bad rate is the ratio of bad loans in the combined labeled loans in the test set.

To take unlabeled data into consideration, the bad loan rate thresholds need to be set lower than normal business bad loan rates that financial institutes could take. Therefore, we report multiple approval rate estimates on different low bad rates, including 2.5%, 3%, and 3.5% in the results.

4 Results and Discussion 4.1 Experiment Results

Attention is turned to table (800) in FIG. 8. Table (800) summarizes the performances of the reject inference methods and benchmarks on the test set, using the techniques of the one or more embodiments. The training size reports the final training size applied in each method compared to the original accepted data size. Fuzzy augmentation uses the full unknown data for the training, while all the other methods selectively include part of unlabeled dataset into their training set. The best of each metric is highlighted in bold in table (800).

For the two benchmarks, fuzzy augmentation does not improve the performance compared to KGB model on most of the metrics. For the self-training method, the XGBoost algorithm works better with calibrated probability as confidence model than the trust score model. Self-training with the probability calibration confidence model outperforms all other methods in terms of area under the curve (AUC), K-S statistics, and an approval rate at 2.5% bad rate. Compared to the KGB model, the approval rate increases from 52.9% to 54.3%, and the K-S statistics improves from 0.367 to 0.381.

In contrast, self-training with the trust score model only performs better than fuzzy augmentation on the approval rates. For the use of weak supervision machine learning methods, the results are more mixed. The K-S statistics, AUC, and approval rate at low bad rate (2.5%) of weak supervision are the lowest among all methods, but approval rates at higher bad rates (3% and 3.5%) are the highest.

The performance gain is relatively modest, but pairwise comparisons do not show significant differences between most of methods. However, considering the large loan volume involved, it is still considered as a significant difference for business purposes.

4.2 Discussion

In the self-training method of the one or more embodiments, calibrated probability was observed to work better with the XGBoost algorithm compared to the trust score model. The choice of credit risk algorithms plays a role in the performance of the confidence models. The trust score confidence model still has the potential to help improve self-training processes for algorithms with well-calibrated probabilistic algorithms such as logistic regression.

The weak supervision method shows mixed results comparing to other methods. The highest approval rate at higher bad rate was observed. This result is likely partially due to the fact that unlabeled data are in general riskier than selected labeled loans and the weak supervision model covers much more unlabeled data when the bad rate is set higher. Most weak classifiers are devised towards precision in identifying bad applicants among relatively high credit applicants rather than covering all population. Therefore, when the bad rates are higher and close to the bad rates threshold business institutes use, the weak supervision technique is more likely to resemble the pattern of the features/labels. In order for this method to perform well consistently on the low bad rate scenarios, one future work is to create more diverse labeling functions to cover, for example, precisely identifying good cases with various degree of coverage. The other reason weak supervision has high applicability in lending may be the ability of weak supervision to cold-start training credit risk models without having the access to any labels, thanks to the generative/discriminative nature of Snorkel labelling models.

The final training set sizes among different methods in FIG. 8 also imply the desirability for unlabeled data selection for inferred training set. Due to technical limitations, not all unlabeled applicants could be predicted accurately. Additionally, the introduction of data that are far from decision boundaries of classifiers may not help with classification performance. Confidence models follow this guideline and select confident predictions into the training set.

5 Conclusion

Thus, the one or more embodiments present several data augmentation methods which can help alleviate sampling bias in credit risk models and evaluate how these methods should be evaluated based not only on the traditional model performance metric, but also on business KPI related metric, i.e., the application approval rate.

It was empirically shown that selectively including data from the loan population with unknown outcome can effectively improve credit risk models, in terms of their performance on the general population. The traditional reject inference method (Fuzzy Augmentation) tends to yield worse performance across all the evaluated metrics. Varying degrees of effectiveness of the proposed methods on improving the approval rate seems to depend on the level of sample bad rate.

Figure 9A:
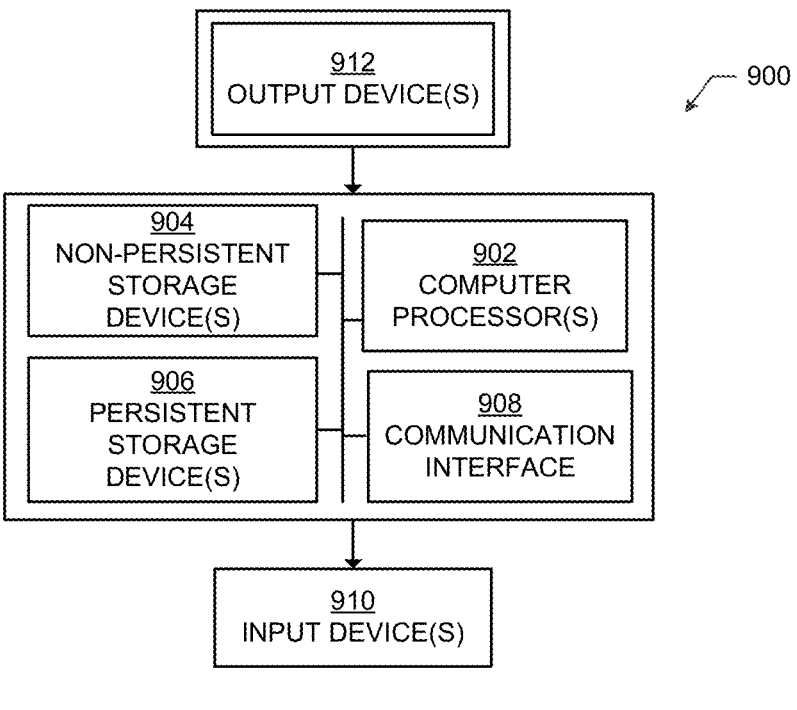
FIG. 9A and FIG. 9B show a computing system and network environment, in accordance with one or more embodiments of the invention.
Figure 9B:
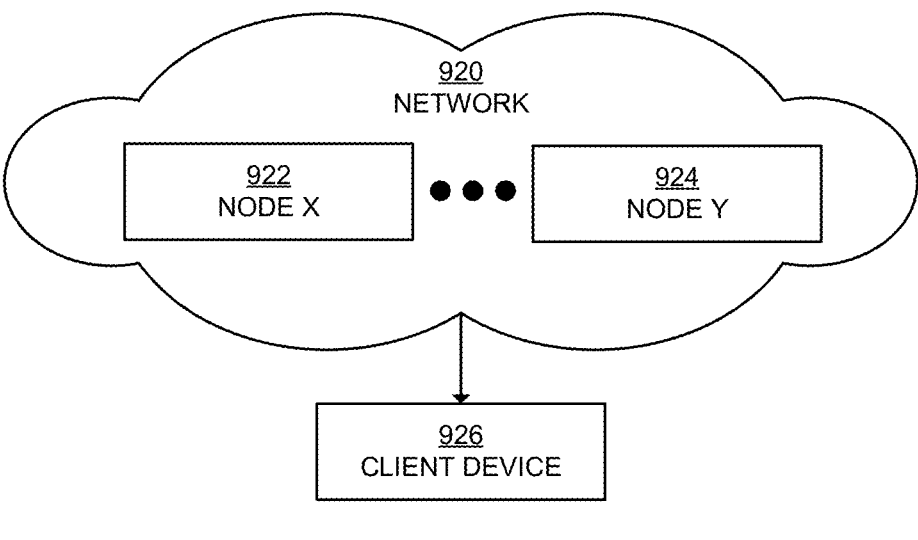

FIG. 9A and FIG. 9B are examples of a computing system and a network, in accordance with one or more embodiments. The one or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processor(s) (902), non-persistent storage device(s) (904) (e.g., volatile memory, such as random access memory (RAM), cache memory), persistent storage device(s) (906) (e.g., a hard disk, an optical drive such as a compact disk (CD) drive or digital versatile disk (DVD) drive, a flash memory, etc.), a communication interface (908) (e.g., Bluetooth interface, infrared interface, network interface, optical interface, etc.), and numerous other elements and functionalities that implement the features and elements of the disclosure.

The computer processor(s) (902) may be an integrated circuit for processing instructions. For example, the computer processor(s) (902) may be one or more cores or micro-cores of a processor. The computing system (900) may also include one or more input device(s) (910), such as a touchscreen, a keyboard, a mouse, a microphone, a touchpad, an electronic pen, or any other type of input device.

The communication interface (908) may include an integrated circuit for connecting the computing system (900) to a network (not shown) (e.g., a local area network (LAN), a wide area network (WAN) such as the Internet, a mobile network, or any other type of network) and/or to another device, such as another computing device.

Further, the computing system (900) may include one or more output device(s) (912), such as a screen (e.g., a liquid crystal display (LCD), a plasma display, a touchscreen, a cathode ray tube (CRT) monitor, a projector, or other display device), a printer, an external storage, or any other output device. One or more of the output device(s) (912) may be the same or different from the input device(s) (910). The input and output device(s) (910 and 912) may be locally or remotely connected to the computer processor(s) (902), the non-persistent storage device(s) (904), and the persistent storage device(s) (906). Many different types of computing systems exist, and the aforementioned input and output device(s) (910 and 912) may take other forms.

Software instructions in the form of computer readable program code to perform the one or more embodiments may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform the one or more embodiments.

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system (900) shown in FIG. 9A, or a group of nodes combined may correspond to the computing system (900) shown in FIG. 9A. By way of an example, the one or more embodiments may be implemented on a node of a distributed system that is connected to other nodes. By way of another example, the one or more embodiments may be implemented on a distributed computing system having multiple nodes, where each portion of the one or more embodiments may be located on a different node within the distributed computing system. Further, one or more elements of the aforementioned computing system (900) may be located at a remote location and connected to the other elements over a network.

Although not shown in FIG. 9B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (922), node Y (924)) in the network (920) may be configured to provide services for a client device (926). For example, the nodes may be part of a cloud computing system. The nodes may include functionality to receive requests from the client device (926) and transmit responses to the client device (926). The client device (926) may be a computing system, such as the computing system (900) shown in FIG. 9A. Further, the client device (926) may include and/or perform all or a portion of the one or more embodiments.

The computing system (900) or group of computing systems described in FIGS. 9A and 9B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the one or more embodiments. The processes may be part of the same or different applications and may execute on the same or different computing systems.

Rather than or in addition to sharing data between processes, the computing system performing the one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the one or more embodiments, may extract one or more data items from the obtained data. For example, the extraction may be performed as follows by the computing system (900) in FIG. 9A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (900) of FIG. 9A, while performing the one or more embodiments, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (900) in FIG. 9A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (900) of FIG. 9A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (900) of FIG. 9A and the nodes (e.g., node X (922), node Y (924)) and/or client device (926) in FIG. 9B. Other functions may be performed using one or more embodiments.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A method for self-training a prediction machine learning model by increasing a size of initially available training data, the method comprising:

training, using accepted data having known labels, an untrained supervised prediction model to generate a trained prediction model, wherein:

the accepted data comprises less than a predetermined amount of training data to achieve a desired accuracy of the trained prediction model, the accepted data comprises the initially available training data, and the untrained supervised prediction model comprises first parameters;

generating, using the trained prediction model, predicted labels for unknown data;

generating, using a confidence model, confidence scores for the predicted labels, wherein the confidence model comprises a logistic regression algorithm comprising second parameters different than the first parameters;

selecting, using the confidence scores, a subset of the unknown data and confident labels, the confident labels comprising ones of the predicted labels for the subset of the unknown data, wherein selecting further comprises:

selecting, as the confident labels, ones of the predicted labels having predicted label values that exceed a threshold value, and selecting, as the subset of the unknown data, portions of the unknown data corresponding to the confident labels, wherein the subset of unknown data is less than the unknown data;

training, using the accepted data, the subset of the unknown data, and the confident labels, the trained prediction model to generate an updated supervised prediction model, wherein the subset of the unknown data, the confident labels, and the accepted data together comprise augmented data that, when used to train the trained prediction model, improves an accuracy of predictions made by the updated supervised prediction model;

executing the updated supervised prediction model on remaining data to generate updated prediction labels, wherein the remaining data comprises the unknown data less the subset of the unknown data;

executing the confidence model on the remaining data to output other confidence scores for the updated predicted labels;

selecting other confident labels for a second subset of the remaining data, outside the subset of data, wherein:

the other confident labels comprise ones of the updated predicted labels for the second subset for which the other confident scores exceed a second threshold, and the other confident labels and the second subset of the remaining data together increase the size of the initially available training data to increased training data;

training, using the second subset and the other confident labels, the updated supervised prediction model to generate a deployed prediction model, wherein the deployed prediction model is more accurate than the trained prediction model trained using the initially available training data due to the increased training data; and deploying the deployed prediction model to an enterprise environment.

2. The method of claim 1 further comprising:

iteratively generating the updated prediction labels, generating the confidence scores, selecting the subset of unknown data, and training the updated supervised prediction model, until a stop condition occurs.

3. The method of claim 2, wherein the stop condition comprises a pre-determined number of iterations.

4. The method of claim 2, wherein the stop condition comprises finding less than a remainder threshold number of updated confidence scores that are above the threshold value.

5. The method of claim 1, further comprising:

receiving live data; and predicting, using the updated supervised prediction model, live prediction labels for the live data.

6. The method of claim 5, wherein the live prediction labels comprise an evaluation of credit risk for a plurality of users from whom the live data was received.

7. The method of claim 1, wherein the untrained supervised prediction model comprises a gradient boosted tree algorithm.

8. A system for self-training a deployed prediction model by increasing a size of initially available training data, the system comprising:

a computer processor;

a data repository in communication with the computer processor;

a training application executable on the computer processor, wherein the training application comprises program code which, when executed, performs a computer-implemented method comprising:

training, using accepted data having known labels, an untrained supervised prediction model to generate a trained prediction model, wherein:

the accepted data comprises less than a predetermined amount of training data to achieve a desired accuracy of the trained prediction model, the accepted data comprises the initially available training data, and the untrained supervised prediction model comprises first parameters;

generating, using the trained prediction model, predicted labels for unknown data;

generating, using a confidence model, confidence scores for the predicted labels, wherein the confidence model comprises a logistic regression algorithm comprising second parameters different than the first parameters;

selecting, using the confidence scores, a subset of the unknown data and confident labels, the confident labels comprising ones of the predicted labels for the subset of the unknown data, wherein selecting further comprises:

selecting, as the confident labels, ones of the predicted labels having predicted label values that exceed a threshold value, and selecting, as the subset of the unknown data, portions of the unknown data corresponding to the confident labels, wherein the subset of unknown data is less than the unknown data; and training, using the accepted data, the subset of the unknown data, and the confident labels, the trained prediction model to generate an updated supervised prediction model, wherein the subset of the unknown data, the confident labels, and the accepted data together comprise augmented data that, when used to train the trained prediction model, improves an accuracy of predictions made by the updated supervised prediction model;

executing the updated supervised prediction model on remaining data to generate updated prediction labels, wherein the remaining data comprises the unknown data less the subset of the unknown data;

executing the confidence model on the remaining data to output other confidence scores for the updated predicted labels;

selecting other confident labels for a second subset of the remaining data, outside the subset of data, wherein:

the other confident labels comprise ones of the updated predicted labels for the second subset for which the other confident scores exceed a second threshold, and the other confident labels and the second subset of the remaining data together increase the size of the initially available training data to increased training data;

training, using the second subset and the other confident labels, the updated supervised prediction model to generate the deployed prediction model, wherein the deployed prediction model is more accurate than the trained prediction model trained using the initially available training data due to the increased training data; and deploying the deployed prediction model to an enterprise environment.

9. A method comprising:

receiving live data comprising unknown labels;

generating an updated supervised prediction model by:

training, using accepted data having known labels, an untrained supervised prediction model to generate a trained prediction model, wherein:

the accepted data comprises less than a predetermined amount of training data to achieve a desired accuracy of the trained prediction model, the accepted data comprises initially available training data, and the untrained supervised prediction model comprises first parameters;

generating, using the trained prediction model, predicted labels for unknown data;

generating, using a confidence model, confidence scores for the predicted labels, wherein the confidence model comprises a logistic regression algorithm comprising second parameters different than the first parameters;

selecting, using the confidence scores, a subset of the unknown data and confident labels, the confident labels comprising ones of the predicted labels for the subset of the unknown data, wherein selecting further comprises:

selecting, as the confident labels, ones of the predicted labels having predicted label values that exceed a threshold value, and selecting, as the subset of the unknown data, portions of the unknown data corresponding to the confident labels, wherein the subset of unknown data is less than the unknown data;

training, using the accepted data, the subset of the unknown data, and the confident labels, the trained prediction model to generate the updated supervised prediction model, wherein the subset of the unknown data, the confident labels, and the accepted data together comprise augmented data that, when used to train the trained prediction model, improves an accuracy of predictions made by the updated supervised prediction model;

generating a deployed supervised prediction model by increasing a size of initially available training data, wherein generating the deployed supervised prediction model further comprises:

executing the updated supervised prediction model on remaining data to generate updated prediction labels, wherein the remaining data comprises the unknown data less the subset of the unknown data;

executing the confidence model on the remaining data to output other confidence scores for the updated predicted labels;

selecting other confident labels for a second subset of the remaining data, outside the subset of data, wherein:

the other confident labels comprise ones of the updated predicted labels for the second subset for which the other confident scores exceed a second threshold, and the other confident labels and the second subset of the remaining data together increase the size of the initially available training data to increased training data;

training, using the second subset and the other confident labels, the updated supervised prediction model to generate a deployed prediction model, wherein the deployed prediction model is more accurate than the trained prediction model trained using the initially available training data due to the increased training data;

deploying the deployed prediction model to an enterprise environment;

generating a result by inputting the live data to the deployed prediction model; and presenting the result to a user device.

10. The method of claim 9 wherein the live data comprises a credit application received from the user device, and wherein presenting the result comprises:

determining a credit value from the predicted labels;

granting or rejecting, automatically, the credit application when the credit value exceeds a credit threshold; and presenting an indication of grant or reject of the credit application to the user device.

* * * * *